United States Patent
Chuah et al.

(10) Patent No.: US 7,324,443 B2
(45) Date of Patent: Jan. 29, 2008

(54) BINARY PROTOCOL FOR SESSION INITIATION IN A WIRELESS COMMUNICATIONS SYSTEM

(75) Inventors: Mooi Choo Chuah, Marlboro, NJ (US); Tingfang Ji, Highland Park, NJ (US); Paul A. Noel, Naperville, IL (US); Donna Michaels Sand, Redmond, WA (US); David Walter Vollman, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1107 days.

(21) Appl. No.: 10/172,505

(22) Filed: Jun. 17, 2002

(65) Prior Publication Data

US 2003/0231626 A1    Dec. 18, 2003

(51) Int. Cl.
*H04J 3/26* (2006.01)
*H04L 12/66* (2006.01)
*G06F 15/173* (2006.01)

(52) U.S. Cl. .................. 370/230; 370/352; 370/356; 709/228

(58) Field of Classification Search .................. None
See application file for complete search history.

(56) References Cited

U.S. PATENT DOCUMENTS 6,771,641 B1 *  8/2004  Sollee et al. ............... 370/356
6,976,081 B2 * 12/2005  Worger et al. ............. 709/230
2002/0126633 A1 *  9/2002  Mizutani et al. ........... 370/329
2004/0034708 A1 *  2/2004  Pelletier et al. ............ 709/227

* cited by examiner

*Primary Examiner*—Chi Pham
*Assistant Examiner*—Soon D. Hyun

(57) ABSTRACT

A method, template, protocol, apparatus, system, and computer software for implementing a binary protocol for session initiation in a wireless communications system. The method for creating, modifying or terminating an IP multimedia session among one or more binary session initiation protocol (B-SIP) entities includes providing a flexible template with at least one mandatory field and at least one optional field, wherein the flexible template has fixed and variable length fields, representing a message type with a template id, and maintaining session specific information in a cache. The message template for creating, modifying or terminating an IP multimedia session among one or more binary session initiation protocol (B-SIP) entities, includes at least one mandatory field and at least one optional field, at least one fixed length field and at least one variable length field, wherein each of said at least one variable length fields is preceded by a length field and each of said at least one optional fields is preceded by an identifier, wherein said at least one mandatory field precedes said at least one optional field and said at least one fixed length field precedes said at least one variable length field.

14 Claims, 4 Drawing Sheets

UserB                SIP Server
   ------ REGISTER ------>

<--- 401 Unauthorized ---

------ REGISTER ------>

<------ 200 OK ------------

```
User B            UserA
 ----INVITE ------>

<----200 OK ------

-----ACK --------->
```

Figure 4

```
User B            UserA
 ----INVITE ------>

<---100 Trying ----

<---180 Ringing ---

<----200 OK -------

----ACK --------->
```

Figure 5

User B                    User A
    -----Bye ------>
    <----200 OK ----

Figure 6

BINARY PROTOCOL FOR SESSION INITIATION IN A WIRELESS COMMUNICATIONS SYSTEM

CROSS-REFERENCE TO RELATED APPLICATIONS

This application is related to a concurrently filed application by Chuah et al., entitled "Protocol Message Compression For a Wireless Communications System", the entire contents of which are hereby incorporated by reference.

BACKGROUND OF THE INVENTION

1. Field of the Invention

This invention relates to communications and, more particularly, to a binary protocol for session initiation in a wireless communications system.

2. Description of Related Art

Two communication technologies are commonly used by the general public; cellular telephony and the Internet. Cellular telephony provides its users with the freedom of mobility—the possibility of being reached with reasonable service quality regardless of location. However, the main service provided by cellular telephony is speech. While flexibility for all kinds of usage (speech, data, video, audio, etc.) has been Internet's strength, its focus has been on fixed connections and relatively large terminals, and the quality of some services (such as Internet telephony) has generally been poor. As technology advances, the Internet and cellular technologies are merging. Future cellular "phones" may contain an IP-stack (internet protocol) and support voice over IP in addition to web-browsing, e-mail, etc. In essence, the Internet is going mobile, or cellular systems are becoming much more than telephony, depending on the point of view.

FIG. 1 shows a conventional network 10 which can be divided into a radio access network (RAN) 12 and a core network (CN) 14. The RAN 12 comprises the equipment used to support wireless interfaces 16a-b between a wireless unit 18a-b and the network 10. The RAN 12 includes NodeBs or base stations 20a-c connected over links (Iub links) 21a-c to radio network or base station controllers (RNC) 22a-b. The interface between the base station and the RNC is referred to as the Iub interface or link, and the interface between two RNCs is referred to as the Iur interface. Currently, both the Iub and Iur interfaces are based on ATM (a synchronous transfer mode), and ATM switches are allowed between NodeBs and RNCs.

The core network 14 includes the network elements that support circuit-based communications as well as packet-based communications. In establishing a circuit channel to handle circuit-based communications between the wireless unit 18b and a public switched telephone network (PSTN) 24 or another wireless unit, the base station 20b receives (in the uplink) and transmits (in the downlink), the coded information (circuit voice or circuit switched data) over the wireless interface or link 16b. The RNC 22b is responsible for frame selection, encryption and handling of access network mobility. The RNC 22b forwards the circuit voice and circuit switched data over a network, such as an ATM/IP network to a 3G mobile switching center (MSC) 30. The 3G-MSC 30 is responsible for call processing and macro-mobility on the MSC level. The 3G-MSC 30 establishes the connectivity between the wireless unit 18b and the PSTN 24.

Commonly used terms in this technical field are "all-IP" and "IP all the way". These terms both relate to the case where an IP is used end to end, even if the path involves cellular links, and IP is also run over the radio hop(s). This is done for all types of traffic, both the user data (e.g. voice or streaming) and control signaling data, either SIP (session initiation protocol) or RTSP (real time streaming protocol). A benefit of this is the service flexibility introduced by IP combined with the freedom provided by continuous mobility. The downside is the relative large overhead the IP protocol suite typically introduces, e.g. due to large headers and text-based signaling protocols.

In cellular systems, the scarce radio resources should be used in an efficient way. It should be possible to support a sufficient number of users per cell, otherwise costs will be prohibitive. Frequency spectrum and thus bandwidth are costly resources in cellular links and should be used carefully.

The ROHC (RObust Header Compression) working group has successfully solved the problem of reducing bandwidth requirements for the header parts of real time protocol (RTP), user datagram protocol (UDP), and IP packets. With this obstacle removed, new possibilities of enhancing mobile internet performance arise. One of these relates to application signaling protocols. Protocols such as SIP, RTSP, and SDP (session description protocol) are typically used to set up and control applications in a mobile Internet. However, the protocol messages are large in size and create delays due to their request/response nature. Compression of these messages would increase spectrum efficiency and reduce transmission delay.

The SIP is an application layer protocol for establishing, modifying and terminating multimedia sessions or calls. These sessions include Internet multimedia conferences, Internet telephony and similar applications. SIP can be used over either TCP (Transmission Control Protocol) or UDP. SIP is a text based protocol, using ISO 10646 in UTF-8 encoding.

The SDP may be used to advertise multimedia conferences and communicate conference addresses and conference tool-specific information. The SDP is also used for general real-time multimedia session description purposes. SDP is carried in the message body of SIP and RTSP messages. SDP is text based using the ISO 10646 character set in UTF-8 encoding.

The RTSP is an application level protocol for controlling delivery of data with real-time properties, such as audio and video. RTSP may use UDP or TCP (or another protocol) as the transport protocol. RTSP is text based using the ISO 10646 character set in UTF-8 encoding.

The above protocols have many similarities. These similarities have implications on solutions to the problems they create in conjunction with the cellular radio access. Their similarities include the following:

Requests and reply characteristics. When a sender sends a request, it stays idle until it has received a response, hence, it typically takes a number of round trip times to conclude a SIP, SDP, or RTSP session.

They are ASCII based. Thus to represent the value 230, 3*8=24 bits are used. A binary representation of the same value, by comparison, would require only 8 bits.

They are large in size in order to provide the necessary information to the session participants.

SIP and RTSP share many common header field names, methods and status codes. Their traffic patterns are also similar. The signaling is carried out primarily during the setup phase. For SIP, this means that the majority of the signaling is carried out to set up a phone call or multimedia session. For RTSP, the majority of the signaling is done before the transmission of application data.

As described above, the SIP is an application-layer control (signaling) protocol for creating, modifying and terminating sessions with one or more participants. These sessions include internet telephone calls, multimedia distribution and multimedia conferences.

SIP invitations are used to create sessions, which carry session descriptions that allow participants to agree on a set of compatible media types. SIP may make use of elements called proxy servers to help route requests to the user's current location, authenticate and authorize users for services, implement provider call-routing policies, and provide features to users. SIP also provides a registration function that allows users to upload their current locations for use by proxy servers. SIP is ASCII based and can run over multiple transport protocols. Since SIP is ASCII based, a parser is required to interpret the various fields.

Typical SIP messages are very large. In wireless network, airlink resources are limited. Thus, the call setup time can potentially be long over a 9.6 Kbps wireless link. There are on-going activities to design compression algorithms for SIP. The need for solving the problems caused by the signaling protocol messages is made clear by looking at a typical SIP/SDP Call Setup sequence over a narrow band cellular channel and by studying results from a simple system capacity example. These results indicate that there also would be a gain to the system capacity by reducing the size of the single protocol messages.

FIG. 2 illustrates an example of an SIP client new registration procedure in accordance with the conventional SIP protocol.

An exemplary Register F1 message (without authentication) for conventional SIP is as follows:
Register sip: ss2.wcom.com SIP/2.0
Via: SIP/2.0/UDP userB@there.com:5060
From: LittleGuy <sip: userB@there.com>
To: LittleGuy <sip: userB@there.com>
Call-ID: 123456789@there.com
CSeq: 1 REGISTER
Contact: <sip:userB@111.111.112.113>
Contact: <sip:+1-972-555-2222(gwl.wcom.co;user=phone>
Contact: tel:+1-972-555-2222
Content-Length: 0.

An exemplary 401 Unauthorized F2 message for conventional SIP is as follows:
SIP/2.0 401 Unauthorized
Via: SIP/2.0/UDP there.com:5060
From: LittleGuy <sip: userB@there.com>
To: LittleGuy <sip: userB@there.com>
Call-ID: 123456789@there.com
CSeq: 1 REGISTER
WWW-Authenticate: Digest Realm="MCI WorldCom SIP"
domain="sip:ss2.wcom.com",
   nonce="ea9c8e88d84f1cec4341ae6cbe5a359",
opaque="", stale=FALSE, algorithm="md5"
Content-Length: 0.

An exemplary Register F3 message for conventional SIP is as follows:
Register sip: ss2.wcom.com SIP/2.0
Via: SIP/2.0/UDP there.com:5060
From: LittleGuy <sip: userB@there.com>
To: LittleGuy <sip: userB@there.com>
Call-ID: 123456789@there.com
CSeq: 2 REGISTER
Contact: <sip:userB@111.111.112.113>
Contact: <sip:+1-972-555-222@gwl.wcom.co;user=phone>
Contact: tel:+1-972-555-2222
Authorization: Digest username="UserB",
realm domain="MCI WorldCom SIP",
nonce="ea9c8e88d84f1cec4341ae6cbe5a359", opaque="",
uri="sip.ss2.wcom.com",
   response="dfe56131d1958046689cd83306477ecc"
Content-Length: 0.

An exemplary 200 OK F4 message for conventional SIP is as follows:
SIP/2.0 200 OK
Via: SIP/2.0/UDP there.com:5060
From: LittleGuy<sip:userB@there.com>
To: LittleGuy <sip: userB @there.com>
Call-ID: 123456789@there.com
CSeq: 2 REGISTER.

As can be seen above, many of the field are populated with long, ASCII character strings, which require extra bandwidth cause service setup delays.

SUMMARY OF THE INVENTION

The present invention is directed to a binary protocol for session initiation in a wireless communications system that shortens the message length, decreases the bandwidth and reduces service set up delays.

The present invention is also directed to a method, template, protocol, apparatus, system, and software for implementing a binary protocol in a wireless communication system. The present invention utilizes a binary session initiation protocol (B-SIP) that combines binary coding, templates, and session specific codebooks. The present invention provides a flexible template with fixed and variable length sub-fields, as well as a flexible template with optional fields. The present invention also utilizes a template ID, the binary encoding of some fields, such as a service provider address, a caller user ID, a caller user name, a callee user ID, and a callee user name, and utilizes IPv4/IPv6 format for domain names. The present invention also enables binary coding of numerical values for some fields. Still further, the present invention provides general purpose lossless text compression. In an exemplary embodiment, binary encoding of numerical fields also helps reduce the size of IP addresses, caller IDs, session IDs, etc. The present invention also includes a flexible template structure and permits the use of fixed lengths for selected template fields and encodes variable length field with either length indicators or delimiters. The present invention also permits optional fields to be inserted into templates to reduce the total number of templates that need to be stored in memory.

In one exemplary embodiment, the present invention is directed to a method for creating, modifying or terminating an IP multimedia session among one or more binary session initiation protocol (B-SIP) entities, including providing a flexible template with at least one mandatory field and at least one optional field, wherein the flexible template has fixed and variable length fields, representing a message type with a template id, and maintaining session specific information in a cache.

In another exemplary embodiment, the present invention is directed to a message template for creating, modifying or terminating an IP multimedia session among one or more binary session initiation protocol (B-SIP) entities, said message template including at least one mandatory field and at least one optional field, at least one fixed length field and at least one variable length field, wherein each of said at least one variable length fields is preceded by a length field and each of said at least one optional fields is preceded by an identifier, wherein said at least one mandatory field precedes said at least one optional field and said at least one fixed length field precedes said at least one variable length field.

BRIEF DESCRIPTION OF THE DRAWINGS

Other aspects and advantages of the present invention may become apparent upon reading the following detailed description and upon reference to the drawings in which:

FIGS. 4 and 5 illustrate two examples of the B-SIP Call Setup procedure in one exemplary embodiment of the present invention.

FIG. 6 illustrates an example of the B-SIP Call Tear Down procedure in one exemplary embodiment of the present invention.

DETAILED DESCRIPTION

Figure 1:
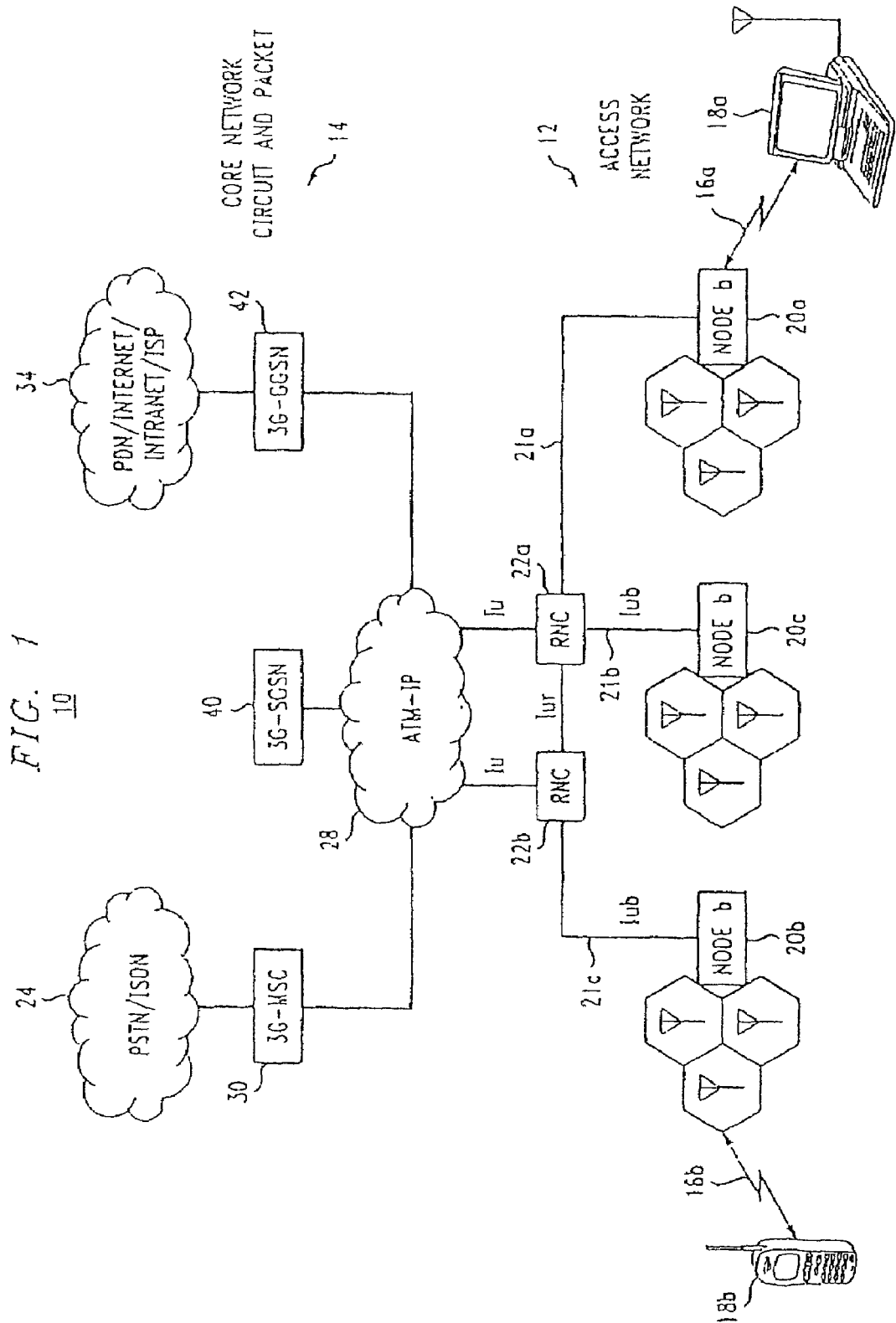
FIG. 1 shows a general block diagram of a conventional network architecture.
Figures 2, 3:
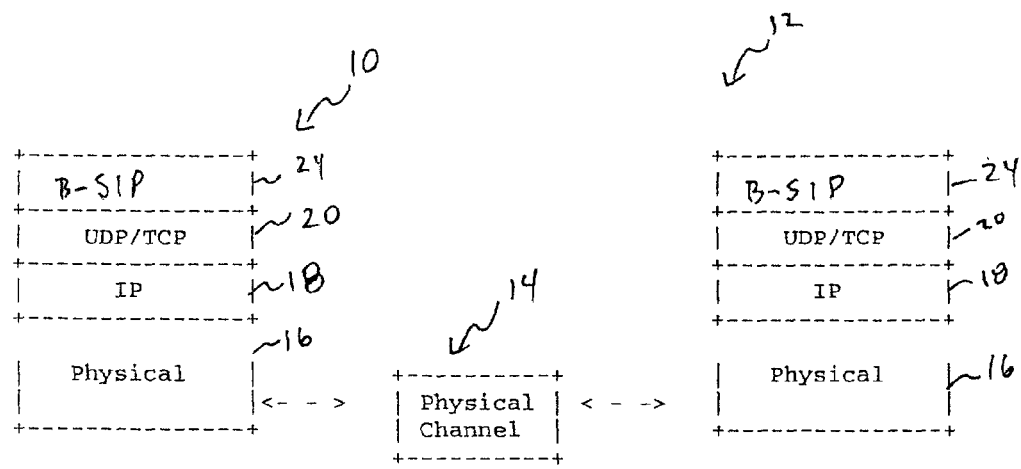
FIG. 2 illustrates an example of an SIP client new registration procedure in accordance with the conventional SIP protocol.
FIG. 3 illustrates an exemplary architecture for implementing the binary protocol for session initiation in one exemplary embodiment of the present invention.

FIG. 3 illustrates the environment in which the binary protocol for SIP messages of the present invention may be performed. As illustrated in FIG. 3, two entities 10, 12 are separated by a physical channel 14. Each entity 10, 12 includes a physical layer 16, and IP layer 18, a UDP/TCP layer 20, and an SIP layer 24. In addition, the SIP layer 24 can be implemented as a raw protocol over the IP layer 18 or even as a raw protocol over the physical layer 16. Still further, layer 20 need not be a UDP/TCP layer but rather could be any other protocol ID usable for PPP negotiation.

The binary protocol for SIP (B-SIP) protocol provides message identifiers for different types of messages that are similar to conventional SIP. B-SIP also provides a plurality of flexible templates (thereby forming a protocol) containing mandatory/optional fields for each message type. Among the mandatory fields, those that require fixed length values come first while those with variable length values have a length field in front. Each optional field is preceded by a sub-field identifier. To provide efficient signaling, a list of the fixed SIP field values can be determined for specific applications. These fields can be hard-wired in the templates. In one embodiment of the present invention, the signaling may be in one of two modes; stateful and stateless. A stateful mode implies that certain B-SIP field values, such as the address_of_record of the caller and callee, are kept in memory for the duration of that call. The corresponding fields can potentially be omitted when messages are received in context. The session states could be stored in the B-SIP interpretation algorithm or derived from the states of the applications. The following examples describe how a user registers, sets up a call, modify parameters during the call and tear down call using the B-SIP in one exemplary embodiment of the present invention.

An example of the B-SIP client new registration procedure in accordance with the present invention is described below in conjunction with FIG. 2. An exemplary Register F1 template (without authentication) for B-SIP is as follows:
MessageID=004
Register sip: F1 SIP/2.0
Via: SIP/2.0/UDP F2:5060
From: F4 <sip:F3@F2>
To: F4 <sip:F3@F2>
Call-ID: F5
CSeq: F6 REGISTER
Contact (F61)(1 byte): tel: F71 (11 bytes)
Contact (F62): <sip: F72>
Contact (F63): <sip: F73>
Contact (F66): mailto F74
Expires (F69):
Content-Length: 0
Field for Register (with authentication)
Authorization (F65): Digest username="F8" (not sent)
realm="F9" (not sent) nonce=F11 (not sent), uri=F10 (not sent),
response=F13 (not sent).
The B-SIP message sent has the following:
mandatory fields:
TemplateID F1 (4 bytes) F2 (4 bytes) F5 (10 bytes) F3 (1 byte length+x1) F4 (1 byte length+x2)
optional fields:
F61 (1 byte)+Pref (1 byte): F71 (1 byte length+11 bytes)
F62 (1 byte)+Pref (1 byte): F72 (1 byte length+value)
F63 (1 byte)+Pref (1 byte): F73 (1 byte length+value)
F69 (1 byte)+4 byte value It is noted that fields F8, F9, F10, F13 are not sent in the first Registration message. When authorization is required, certain fields will be transmitted depending on the fields that need to be altered from the 401 message.

As a result, the total message length=20+x1+x2+F8 onwards.

As can be seen from above, many of the ASCII string in the conventional SIP protocol are replaced with binary representations. These replacement make the message smaller and alleviate the need for a parser.

In the present embodiment, F1 may be in the form of an IPv4 address, the default "all SIP servers" multicast address "sip.mcast.net" (224.0.1.75) can be used. Further, F2 may reserve either 1 byte or 4 byte for a service provider identifier. Still further, the above example assumes the SIP port number 5060 is used, but this need not be the case. Further for the From and To fields, it is assumed that the same address_of_record will be used, but this need not be the case. Still further, F3 can be represented using 10 bytes, as can the Call_ID, but this need not be the case.

An exemplary 401 Unauthorized F2 message template for B-SIP is as follows:
TemplateID=041
SIP/2.0 401 Unauthorized
Via: SIP/2.0/UDP F2:5060 (not repeated)
From: F4 <sip:F3@F2> (not repeated)
To: F4 <sip:F3@F2> (not repeated)
Call-ID: F5
CSeq: F6 REGISTER
WWW-Authenticate: Digest Realm="F9" domain="F10", nonce="F11",
opaque="", stale=FALSE, algorithm="F12"
Content-Length: 0.
The B-SIP 401 Unauthorized F2 message includes the following:
TemplateID (1 bytes) F5 (10 bytes) F10 (4 bytes) F11 (16 bytes) F12 (1 byte)
As a result, the total message length is 23 bytes+F8.
An exemplary Register F3 message template for B-SIP is as follows:
TemplateID=023
SIP/2.0 200 OK
Via: SIP/2.0/UDP F2:5060
From: F4 <sip:F3@F2>
To: F4 <sip:F3@F2>
Call-ID: F5
CSeq: F6 REGISTER Option Fields:
Contact (F61): expires=F81
Contact (F62): expires=F82
Contact (F63): expires=F83
Content-Length;0.

The B-SIP Register F3 message for B-SIP includes the following:
TemplateID(1 byte) F5 (10 bytes) F6(4 bytes)
As a result, the total message length is 15 bytes.

Two examples of the B-SIP Call Setup procedure in accordance with the present invention is described below in conjunction with FIGS. 4 and 5.

For ease of understanding, in the following examples, the B-SIP message formats are fitted to existing SIP messages. However, this is not required, in fact, there is no need for the B-SIP templates to have the same SDP filed formats, etc., as the conventional SIP message. For example, it is sufficient for B-SIP to have a message, which could also be referred to as INVITE, that looks like the following (described in more detail below):
TemplateID (1 byte) Transport Option/Version Number (1 byte) F2 (4 byte) F3 (1 byte) F1 (10 bytes) F5 (10 bytes) F8 (10 bytes) F4 (1 byte+x1 bytes) F6 (1 byte+x2 bytes) F9 (2 bytes) F61 (1 byte) F71 (4 bytes).

The regular SIP INVITE message format is merely used to help convey what the Fx (x=1,2 . . . 71) fields represent.

Using the conventional SIP fields and notation, an exemplary INVITE message template for B-SIP is as follows:
TemplateID=001
INVITE sip: F1@F2 SIP/2.0
Via: SIP/2.0/UDP F3:5060
From: F4 <sip:F5@F3>
To: F6 <sip:F1@F2>
Call-ID: F7
CSeq: F8 INVITE
Contact (F61): <sip:F5(F71>
Content-Type: application/sdp
Content-Length: F9
  (SDP Template)
v=0
o=F1 F110 F110 IN F111 F2'
s=Session SDP
c=IN F111 F71
t=0 0
m=F100 F101 RTP/AVP F102
a=rtpmap:F105 F106
a=qos:F103 F104.

The INVITE message for B-SIP includes the following:
Mandatory SIP fields
TemplateID (1 byte), Transport Option/Version Number(1 byte)
F2+F3(1 byte), F1(10 bytes), F5(10 bytes),
F4 (1 byte length indicator+x1 bytes), F6 (1+x2 bytes)
F7 (10 bytes), F8 (4 bytes), F9 (2 bytes), F61 (1 byte), F71(4 bytes)
Mandatory SDP fields
SessionID (F110): 4 bytes
IPversion (F111)=1 byte
Optional SDP fields
m:<media><port><transport><fmt list>
a:<rtpmap:<payload type><encoding name>/<clock rate>[/<encoding parameters>]
a:keyword:value
F100+F103+F104: 1 byte for media type:
audi/video+qos+sendrecv/sendonly/recvonly
F101: 2 bytes for port number
F102,F105,F106: 1 byte (loaded from the media profile, if compatible).

As a result, the total message length is 51+x1+x2+ optional SDP field length.

An exemplary 100 Trying message template for B-SIP is as follows:
TemplateID=010
SIP/2.0 100 Trying
Via: SIP/2.0/UDP F1:5060
From: F2 <sip:F3@F1>
To: F4 <sip:F5@F6>
Call-ID: F7 10 bytes
CSeq: F8 4 bytes
Content-Length: 0.

The 100 Trying message for B-SIP includes the following:
TemplateID+F7+F8.
As a result, the total message length is 1+10+4=15 bytes.

An exemplary 180 Ringing message template for B-SIP is as follows:
TemplateID=011
SIP/2.0 180 Ringing
Via: SIP/2.0/UDP F1:5060
From: F2 <sip:F3@F1>
To: F4 <sip:F5@F6>
Call-ID: F7 10 bytes
CSeq: F8 4 bytes
Content-Length: 0.

The 100 Trying message for B-SIP includes the following:
TemplateID+F7+F8
As a result, the total message length is 1+10+4=15 bytes.

An exemplary template for 200 OK (respond to INVITE) is as follows:
TemplateID=020
SIP/2.0 200 OK
Via: SIP/2.0/UDP F2:5060
From: F4 <sip:F3@F2>
To: F4 <sip:F3@F2>; tag=F7
Call-ID: F5
CSeq: F6 INVITE
Option Fields:
Contact (F61): expires=F81
Contact (F62): expires=F82
Contact (F63): expires=F83
Content-Length;F8
+
Template for SDP.

The 200 OK (respond to INVITE) message for B-SIP includes the following:
TemplateID (1 byte)
+F5 (10 bytes)+F6(4 bytes)+F7(10 bytes)+F8 (2 bytes)
+F110 (4 bytes)+F111 (1 byte)
+61 onward
As a result, the total message length is 32+optional field length.

An exemplary template for ACK is as follows:
TemplateID=002
ACK sip:F1@F2 SIP/2.0
Via: SIP/2.0/UDP F3:5060
From: F4 <sip:F5@F3>
To: F6 <sip:F7@F2>; tag=F8
CallID: F9
CSeq: F10
Content-Length: 0

The ACK message for B-SIP includes the following:
TemplateID (1 byte)+F8 (10 bytes)+F9 (10 bytes)+F10 (4 bytes)
As a result, the total message length is 25 bytes.

Figure 6:
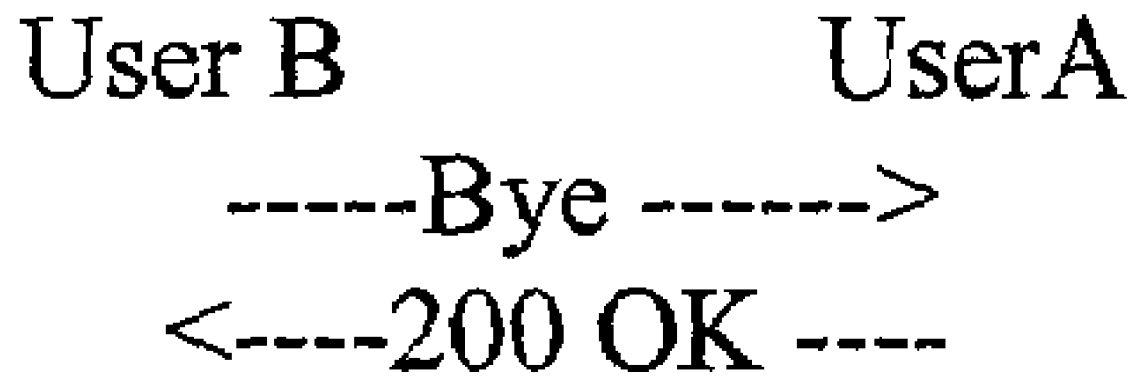

FIG. 6 illustrates an example of the B-SIP Call Tear Down procedure in accordance with the present invention.

An exemplary template for the BYE message template for B-SIP is as follows:
TemplateID=003
BYE sip:F1@F2 SIP/2.0
Via: SIP/2.0/UDP F3:5060
From: F4 <sip:F5@F3>; tag=F7
To: F6 <sip:F1:F2>
CallID=F8
CSeq=F9
Content-Length=0.

The BYE message for B-SIP includes the following:
TemplateID (1 byte)+F7(10 bytes)+F8 (10 bytes)+F9 (4 bytes)

As a result, the total message length is 25 bytes.

An exemplary template for the 200 OK (to BYE) message for B-SIP is as follows:
TemplateID=022
SIP/2.0 200 OK
Via: SIP/2.0/UDP F2:5060
From: F4 <sip:F3@F2>
To: F4 <sip:F3@F2>; tag=F7
Call-ID: F5
CSeq: F6 BYE
Content-Length: 0

The BYE message for B-SIP includes the following:
TemplateID(1 byte) F5 (10 bytes) F6(4 bytes) F7(10 bytes).

As a result, the total message length is 25 bytes.

As described above, B-SIP is designed to reduce the parsing CPU time of SIP messages and reduce the delay over bandwidth limited wireless links. The strength of B-SIP lies the flexible template approach, state-full B-SIP interpreter, fixed field width and binary representation of the numerical SIP field values. A tradeoff between the complexity of the algorithm and the message size may be made. If more templates are used to accommodate typical option combinations for a type of message, the header size can be reduced, thereby enabling quick reaction by just checking the TemplateID without fully analyzing the message.

The binary-based session initiation protocol (B-SIP) described above may provide a major subset of the SIP features. The B-SIP design can be easily implemented and does not require a complicated parser and allows interoperability with conventional SIP-based devices. B-SIP may be used in Push-to-Talk products.

Other features include the use of a template ID, the binary encoding of selective fields, such as the service provider address, the caller user ID, the caller user name, the callee user ID name, and the calleE user name, and an IPV4 format for domain names. Still further, these features include codebook management and session history. Still further, these features include a flexible template with fixed and variable length fields as well as a flexible template with optional fields. One or more combinations of the above features are effective in providing general purpose lossless text compression.

Although the above-identified examples have been described in the context of SIP protocol messages, these examples are equally applicable to SDP, RTSP or any other known or later developed protocol.

Still further, although the features of the present invention have been described above in the context of a method, these features are also applicable to apparatus, system, and software applications, and embodying the teachings of the present application in an apparatus, system, or software would be achievable by one of ordinary skill in the art.

What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

We claim:

1. A method for creating, modifying or terminating an IP multimedia session among one or more binary session initiation protocol (B-SIP) entities, comprising:
    providing a flexible template with at least one mandatory field and at least one optional field, wherein the flexible template has fixed and variable length fields;
    representing a message type with a template id;
    creating, modifying, or terminating the IP multimedia session among the one or more B-SIP entities using the flexible template; and
    maintaining session specific information in a cache; wherein,
    the flexible template corresponding to SIP respond messages eliminates repeat information.

2. The method of claim 1, wherein fixed length fields are provided at the beginning of the flexible template and a variable length field is indicated by delimiter or length coding.

3. The method of claim 1, wherein each of the at least one optional fields is preceded with a header ID.

4. The method of claim 1, wherein a service provider address is assigned short binary IDs and stored in a B-SIP memory.

5. The method of claim 1, wherein each B-SIP entity is initialized with a unique user ID and a number of group IDs to which the B-SIP entity belongs.

6. The method of claim 5, wherein when a B-SIP entity is a caller, the unique user ID is used in place of the address of record of the caller if a message is sent to a capable server.

7. The method of claim 5, wherein
    when a B-SIP entity is a callee, an address of record is used in place of the unique user ID.

8. The method of claim 5, when a B-SIP entity is a caller, the unique user ID is used in place of the address of record of the caller if a message is sent to a capable B-SIP server and when a B-SIP entity is a callee, an address of record is used in place of the unique user ID.

9. The method of claim 1, wherein the capable B-SIP server implements user ID look up.

10. The method of claim 1, wherein the flexible template includes a domain name field and an IP address field and the domain name field and the IP address field are represented in binary format.

11. The method of claim 10, wherein the domain name field and the IP address field are represented by four bytes for an IPv4 address.

12. The method of claim 1, wherein the flexible template includes at least one field containing a numerical value and the numerical value is encoded in binary format.

13. The method of claim 1, wherein all fields of the flexible template are binary coded or binary represented.

14. The method of claim 13, wherein the fields of the flexible template that are binary coded or binary represented include media description, media load profile ID, encoding type, and sampling rate.

* * * * *